(12) United States Patent
Modai et al.

(10) Patent No.: US 10,122,896 B2
(45) Date of Patent: Nov. 6, 2018

(54) SYSTEM AND METHOD OF MANAGING TRANSMISSION OF DATA BETWEEN TWO DEVICES

(71) Applicant: Avaya Inc., Santa Clara, CA (US)

(72) Inventors: Ori Modai, Ramat-Hasharon (IL); Venkatesh Krishnaswamy, Holmdel, NJ (US); Gal Eliraz-Levonai, Tel-Aviv (IL); Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 322 days.

(21) Appl. No.: 15/003,254

(22) Filed: Jan. 21, 2016

(65) Prior Publication Data

US 2016/0142591 A1    May 19, 2016

Related U.S. Application Data

(63) Continuation-in-part of application No. 14/945,587, filed on Nov. 19, 2015, which is an application for the reissue of Pat. No. 8,970,651.

(60) Provisional application No. 62/105,802, filed on Jan. 21, 2015.

(51) Int. Cl.
| | |
|---|---|
| *H04N 5/04* | (2006.01) |
| *H04N 7/14* | (2006.01) |
| *H04N 5/45* | (2011.01) |
| *H04N 21/242* | (2011.01) |
| *H04N 21/8547* | (2011.01) |
| *H04N 21/41* | (2011.01) |

(52) U.S. Cl.
CPC ............... *H04N 5/04* (2013.01); *H04N 5/45* (2013.01); *H04N 7/148* (2013.01); *H04N 21/242* (2013.01); *H04N 21/4126* (2013.01); *H04N 21/8547* (2013.01)

(58) Field of Classification Search
CPC ................................ H04N 7/147; H04N 7/15
USPC ................ 348/14.02, 14.08, 14.09; 345/473; 370/352, 509; 704/233; 709/204, 227; 713/400
See application file for complete search history.

(56) References Cited

U.S. PATENT DOCUMENTS

| | | |
|---|---|---|
| 5,491,498 A | 2/1996 | Koyama et al. |
| 6,181,693 B1 | 1/2001 | Maresca |
| 6,275,239 B1 | 8/2001 | Ezer et al. |

(Continued)

OTHER PUBLICATIONS

U.S. Appl. No. 14/945,587, filed Nov. 19, 2015, Vernick.

(Continued)

*Primary Examiner* — Ovidio Escalante
(74) *Attorney, Agent, or Firm* — Sheridan Ross P.C.

(57) ABSTRACT

Disclosed herein are systems, methods, and non-transitory computer-readable storage media for detect adjunct peripherals, and coordinating their media capabilities (as a preparation to be able to signal their capabilities). The host device and the peripherals can synchronize wall clocks. The system sets up a call (or receive a call) from a remote host device, and requests the peripherals to check for network connectivity to the remote host device (connectivity check). This check can be done by using a STUN/TURN procedure. The system establishes direct connectivity between the peripherals and the remote host device and monitors lip sync by transferring RTCP messages between the host device and the peripherals and instructing display and playback peripherals/sub systems to align lip sync.

20 Claims, 8 Drawing Sheets

(56) References Cited

U.S. PATENT DOCUMENTS

| | | | |
|---|---|---|---|
| 6,708,176 | B2 | 3/2004 | Strunk et al. |
| 7,573,868 | B2 | 8/2009 | Cutler et al. |
| 7,639,716 | B2 | 12/2009 | Murphy et al. |
| 7,765,302 | B2 | 7/2010 | Whynot et al. |
| 8,225,127 | B2 | 7/2012 | Vonog et al. |
| 8,289,367 | B2 | 10/2012 | Graham et al. |
| 8,416,281 | B2 | 4/2013 | Ogle et al. |
| 8,849,660 | B2 | 9/2014 | Rodriguez et al. |
| 8,856,231 | B2 | 10/2014 | Saito et al. |
| 8,970,651 | B2 | 3/2015 | Vernick |
| 2002/0166119 | A1* | 11/2002 | Cristofalo ............ H04N 5/4401 725/34 |
| 2007/0200925 | A1 | 8/2007 | Kim |
| 2010/0049865 | A1* | 2/2010 | Hannuksela ... H04N 21/234327 709/231 |
| 2012/0063603 | A1* | 3/2012 | Evans ................ H04N 21/6156 381/17 |
| 2014/0168345 | A1* | 6/2014 | Vernick .................. H04N 7/147 348/14.02 |
| 2017/0310500 | A1* | 10/2017 | Dawes ................ H04L 12/2832 |

OTHER PUBLICATIONS

Official Action for U.S. Appl. No. 13/715,130, dated Jul. 3, 2014, 7 pages.
Notice of Allowance for U.S. Appl. No. 13/715,130, dated Oct. 28, 2014, 8 pages.

* cited by examiner

SYSTEM AND METHOD OF MANAGING TRANSMISSION OF DATA BETWEEN TWO DEVICES

PRIORITY CLAIM

The present application claims the priority of U.S. Patent Provisional Application No. 62/105,802, filed Jan. 21, 2015, the content of which is incorporated herein by reference in its entirety.

The present application is also a continuation-in-part of U.S. patent application Ser. No. 14/945,587, filed Nov. 19, 2015, which is a reissue of U.S. patent application Ser. No. 13/715,130, filed Dec. 14, 2012, now U.S. Pat. No. 8,970,651, issued Mar. 3, 2015, the contents of which are incorporated herein by reference in their entirety.

BACKGROUND

1. Technical Field

The present disclosure relates to communicating data and more specifically to a system and method of how a group of devices will divide up responsibilities between call signaling and RTCP synchronizing to reduce the need for conveying media between particular devices via a host device.

2. Introduction

Most video conferencing systems are "all-in-one" devices. These systems often require wired connections between the various components, such as microphones, speakers, monitors, and cameras. In certain cases, recent wireless technologies, such as Wireless HDMI and Wireless USB, allow some of these components to be connected wirelessly. However, these wireless connections are generally fixed between the wirelessly-connected components, and therefore restrict mobility. Moreover, since most devices, such as computers and phones, do not typically have built-in Wireless HDMI or Wireless USB capabilities, they require hardware "dongles" or adapters to provide wireless connectivity with other components. This greatly complicates matters for the user.

Also, current video conferencing systems do not utilize other new and powerful wireless technologies, such as WIFI direct, to integrate different devices or components. Moreover, current solutions fail to use wireless capabilities to provide greater mobility while allowing devices to seamlessly integrate other devices during a conference and automatically extend the conferencing capabilities utilized during the conference. For example, current solutions do not allow an audio-only conferencing device to automatically add video conferencing to an audio conference when the audio-only conferencing device enters the vicinity of a video conferencing device with wireless capabilities. With current solutions, if a user is on an audio-only call through a mobile phone and the user wishes to add high quality video beyond the capabilities of the mobile phone, the user must manually transfer or reestablish the entire call on another device.

In addition to the above issues, there is a a problem of transmitting data between two devices, and make the host device hardware and software simpler. A method to interconnect a host device to its peripherals via a wireless medium is described in related patent application Ser. No. 13/715,130, incorporated herein by reference. The current disclosure simplifies the process of creating a host device by eliminating the cables between the peripherals and the host device. FIGS. 1 and 2 in the '130 application show the host device is required to receive the streams, aggregate them and handle things like "de-lip sync" and so forth.

The requirement of handling so much data requires a load on the host device which might not be applicable on the host device to handle, for instance high bandwidth video, and potentially complex network algorithms (FEC, retransmission, encryption, etc). A classic example is the need to extend a mobile or a table top phone with the ability to receive and transmit video and data.

The current implementations are based on the central manager that collects all the data, the peripherals, camera and microphone, are hardwired connected. The '130 application describes a way to allow the peripherals of the host device to be connected via a wireless medium such as Bluetooth or WiFi to the "host EP" or host external peripheral. The main challenge with this approach was the need to path all the media streams through a single host EP, which centralizes and handles them.

This might restrict in many cases the ability to extend existing low complexity devices such as phones or battery life limited life such as mobile devices or smart phones with high compute or high network throughput media such as video. There are products that use wireless microphones that send the data to the EP were the data is processed, packetized and sent to the network. There are no products that send the data directly to the network. There are products that include a wireless video camera, yet these products are typically complex and include a deployment architecture that requires a centralized device to aggregate their transmission and media.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A first approach which is the focus of the present application addresses how a group of devices divide up responsibilities between call signaling and RTCP synchronization to reduce the need for conveying media between particular devices via a host device. Another advantage is to introduce a way to leverage existing simple devices and with a software upgrade to allow these devices to include new media modalities, such as video, while avoiding the pitfalls of limitations of CPU or network capabilities. This is accomplished by allowing the peripherals (video camera, display unit) to transmit/receive directly to the network.

An example method includes detecting, at a host device, a first peripheral and a second peripheral. The system coordinates media capabilities of the first peripheral and the second peripheral. The system synchronizes wall clocks amongst the host device, the first peripheral and the second peripheral and establishes a communication between the host device and a remote device. The system requests the first peripheral and the second peripheral to check for network connectivity to the remote device and establishes direct connectivity between the first peripheral and the remote device. The system then establishes direct connectivity between the second peripheral and the remote device and monitors synchronization by transferring messages between the host device and the first peripheral and the second peripheral. Finally, the system instructs a display and playback peripheral to align with the synchronization.

Other approaches set forth herein can be used to wirelessly integrate different devices and components in a conferencing system. Using powerful wireless capabilities, these approaches provide users great mobility when conferencing, and allow conferencing devices to seamlessly integrate other devices during the conference and automatically extend media capabilities utilized during the conference. For example, a user participating in an audio-only conference through an audio-only phone can automatically add high quality video to the conference by wirelessly connecting to a nearby device with video capabilities. If the user wants to move to a different location, she can automatically transfer the video portion of the conference wirelessly to another nearby device with video capabilities. On the other hand, if the user does not want to move to a different location, but simply wants to transfer the video portion of the conference to a different device with better video capabilities, she can automatically do so via a wireless connection, without transferring or reestablishing the entire call.

Disclosed are systems, methods, and non-transitory computer-readable storage media for integrating audio and video conferencing capabilities. During a communication session between a first device and a second device, the first device receives an audio portion of the communication session from a user. The first device then receives, via a wireless connection, a video portion of the communication session from a third device. The first device can establish the communication session as an audio only communication session and subsequently send a message to the third device to initialize video input and output to establish video capabilities for the communication session. The video portion of the communication session can include compressed video frames captured by a camera associated with the third device, such as an internal camera or an external camera. The third device can be any device with wireless capabilities. For example, the third device can be a wireless conferencing gateway that transmits video frames captured from a camera device to the first device. The third device can also include a video encoder/decoder, a camera, a wireless interface, and/or a video output. The wireless connection can be, for example, a direct wireless connection between the devices. The direct wireless connection can be based on the 802.11 standards, for example. Here, the devices can directly connect to each other using a wireless standard such as WIFI Direct. Moreover, the devices can do wireless pairing to allow the devices to seamlessly communicate with each other.

Then, the first device synchronizes the audio portion of the communication session and the video portion of the communication session to yield a synchronized audio and video portion of the communication session. To synchronize the audio and video portions of the communication session, the first device can set lip synchronization attributes on the video portion of the communication session with audio from the audio portion of the communication session. Next, the first device sends the synchronized audio and video portion of the communication session to the second device. If the first device receives video and/or audio frames associated with the communication session from the second device, the first device can check lip synchronization attributes on the video frames and, at a time that is based at least in part on the lip synchronization attributes, send the video frames to the third device to be decoded and displayed at the third device. Accordingly, the third device can display the video frames received from the second device while the first device outputs corresponding audio frames received from the second device.

Lip synchronization can be achieved by periodically synchronizing the clocks between multiple devices. Using well known algorithms, one device can act as a master and the other devices can act as slaves, where the master and slaves exchange network messages to synchronize their clocks. Thus, for example, the first device and the third device can periodically synchronize their clocks for lip synchronization. Using well known algorithms, the first device or the third device can act as a master device while the other device can act as a slave device. The master device (e.g., the first device) and the slave device (e.g., the third device) can then exchange network messages to synchronize their clocks in order to perform lip synchronization based on the lip synchronization attributes.

The first device can also receive additional portions of the communication session from other devices in addition to the third device. For example, if the user of the first device wants to move to a location beyond the wireless range of the third device, or if the user simply wants to display the video of the communication session at a different display device, the user can do so by wirelessly connecting the first device to a fourth device with wireless capabilities. Here, the first device can receive a second portion of the communication session from the fourth device, synchronize the second video portion of the communication session and a corresponding audio portion of the communication session, and send the synchronized audio and video portion of the communication session to the second device. The first device can wirelessly connect to the third and/or fourth device when the first device detects that the third and/or fourth device is/are within wireless range of the system. The first device can also connect to other wireless devices to receive video portions as the user moves to different locations or prompts the first device to establish the connection, for example.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses for wirelessly integrating audio and video conferencing capabilities. A system, method and computer-readable media are disclosed which integrate audio and video conferencing capabilities. A brief introductory description of a basic general purpose system or computing device in FIG. 1, which can be employed to practice the concepts, is disclosed herein. A more detailed description and variations of wirelessly integrating audio and video conferencing capabilities will then follow. These variations shall be described herein as the various embodiments are set forth. The disclosure now turns to FIG. 1.

Figure 1:
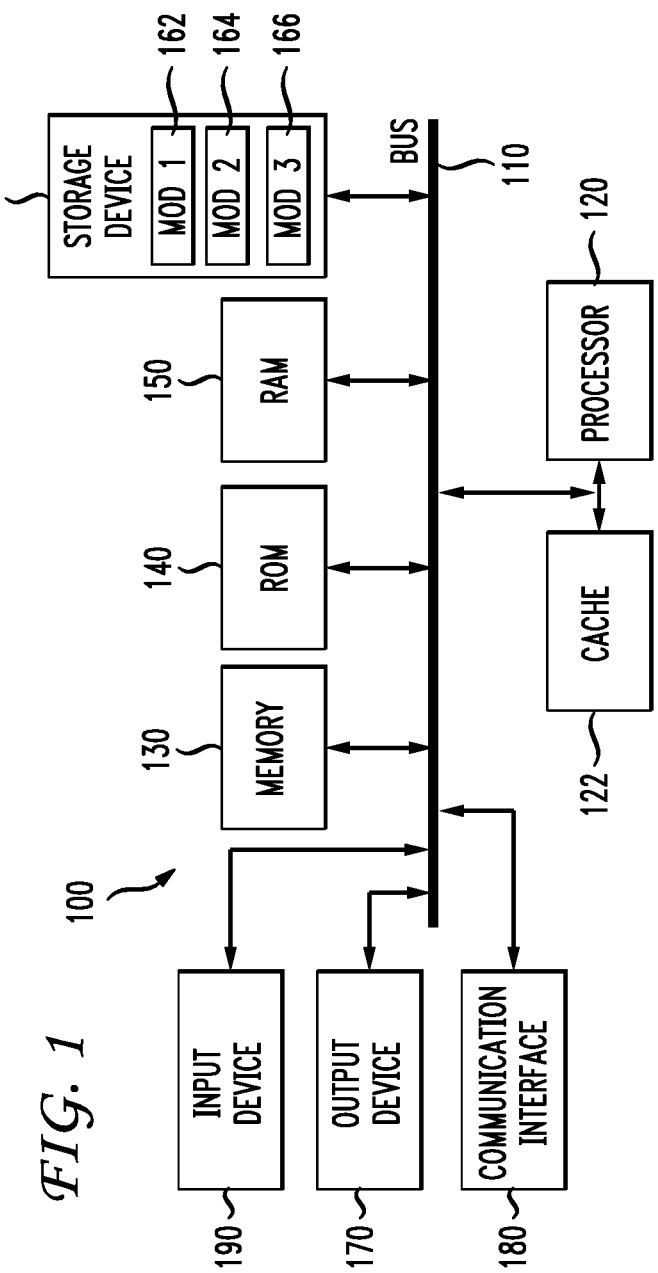
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
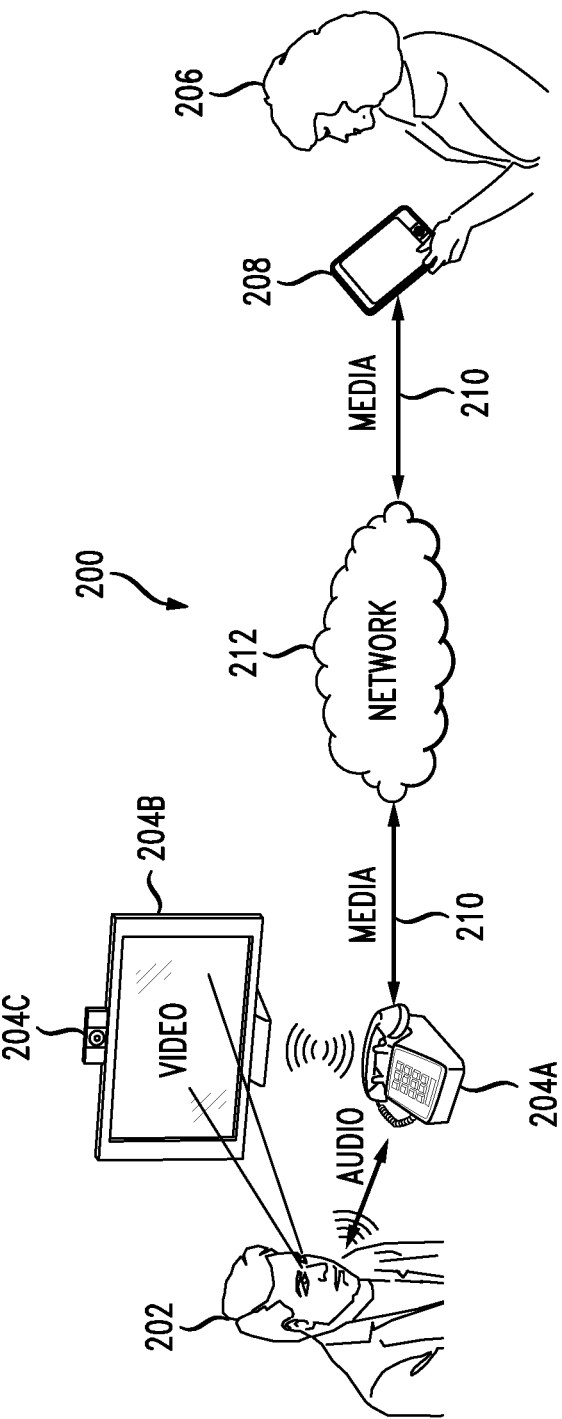
FIG. 2 illustrates an exemplary system for wirelessly integrating audio and video conferencing capabilities.

Having disclosed some components of a computing system, the disclosure now turns to FIG. 2, which illustrates an exemplary system 200 for wirelessly integrating audio and video conferencing capabilities. Here, user 202 can start an audio call with user 206 using the phone 204A. In some embodiments, user 202 can otherwise start the audio call with user 206 using any other device with networking capabilities, such as a laptop, a portable media player, an IP television, a conferencing system, a tablet computer, a media device, an electronic reader, etc. In FIG. 2, the phone 204A connects to the media device 208, used by the remote user 206, via the network 212. The network 212 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network. The media device 208 can be any device with networking capabilities, such as a laptop, a portable media player, an IP television, a conferencing system, a tablet computer, a media device, an electronic reader, and so forth.

If the user 202 decides to add video to the call, she can do so via the display device 204B and the wireless conferencing gateway 204C, without having to transfer or reestablish the entire call. Here, the user 202 can use the display device 204B to display video frames sent by the remote user 206 from the media device 208 as part of the video portion of the call. The user 202 can also use the wireless conferencing gateway 204C to capture video frames and send the video frames to the remote user 206, as part of the video portion of the call. The user 202 can add video to the call before establishing the call or at any point during the call. Once the user 202 adds video to the call, she can subsequently change which device(s) capture, display, and manage the video portion of the call at any point during the call.

To add video to a call, the phone 204A can, either before or during the call, wirelessly connect to the wireless conferencing gateway 204C, which provides the video conferencing capabilities. The phone 204A and wireless conferencing gateway 204C can directly connect with each other over wireless. Here, the display device 204B and/or the wireless conferencing gateway 204C do not have to be connected to the network 212, as they can communicate directly with the phone 204A over WiFi, for example. The phone 204A and wireless conferencing gateway 204C can automatically connect directly with each other over wireless when the devices are within a wireless range. For example, the phone 204A and wireless conferencing gateway 204C can automatically establish a direct wireless connection via a wireless connection based on the 802.11 standards, such as WIFI direct. Also, the phone 204A and wireless conferencing gateway 204C can automatically connect based on preconfigured settings and/or input from the user 202. Moreover, the phone 204A can present a prompt, such as an audio prompt, to the user 202 requesting permission to connect to the wireless conferencing gateway 204C when the phone 204A detects that the wireless conferencing gateway 204C is within a wireless range. The phone 204A can then connect to the wireless conferencing gateway 204C when the user grants the phone 204A permission to connect to the wireless conferencing gateway 204C, in response to the prompt.

Alternatively, the phone 204A can automatically connect to the wireless conferencing gateway 204C when it detects that the wireless conferencing gateway 204C is within a wireless range, without presenting a prompt to the user 202. In one embodiment, the phone 204A and the wireless conferencing gateway 204C establish an application-level WIFI direct connection and directly communicate over a standard IP connection. The phone 204A and wireless conferencing gateway 204C can "see" each other using standard WIFI protocols. Moreover, the phone 204A and wireless conferencing gateway 204C can include a WIFI direct service application, which they can use to exchange information, such as information regarding security, video codec, framerate, resolution, hardware capabilities, software capabilities, etc.

The wireless conferencing gateway 204C can send video frames captured by a camera on the wireless conferencing gateway 204C to the phone 204A, which the phone 204A can then transmit to the media device 208 as part of the video portion of the call. In some embodiments, the wireless conferencing gateway 204C has a built-in camera which captures the video frames to be sent to the phone 204A. In other embodiments, the camera is a device separate from the wireless conferencing gateway 204C. Here, the wireless conferencing gateway 204C receives the video frames from the camera, and relays the video frames to the phone 204A. The wireless conferencing gateway 204C can compress and encode the video frames and send the video frames to the phone 204A for transmission to the remote user 206. The phone 204A can then append network headers to the video frames, set lip synchronization attributes with audio from the user 202, and send the video frames to the remote user 206.

The wireless conferencing gateway 204C also receives video frames sent by the phone 204A and originating from the media device 208 used by the remote user 206, and transmits the video frames to the display 204B for display. The phone 204A can synchronize the video frames with audio from the audio frames and, at an appropriate time, send the video frames to the wireless conferencing gateway 204C to be decoded and displayed on the display 204B. The wireless conferencing gateway 204C includes a video decoder/encoder and a video output to allow the video frames from the remote user 206 to be outputted to a display.

Figure 3:
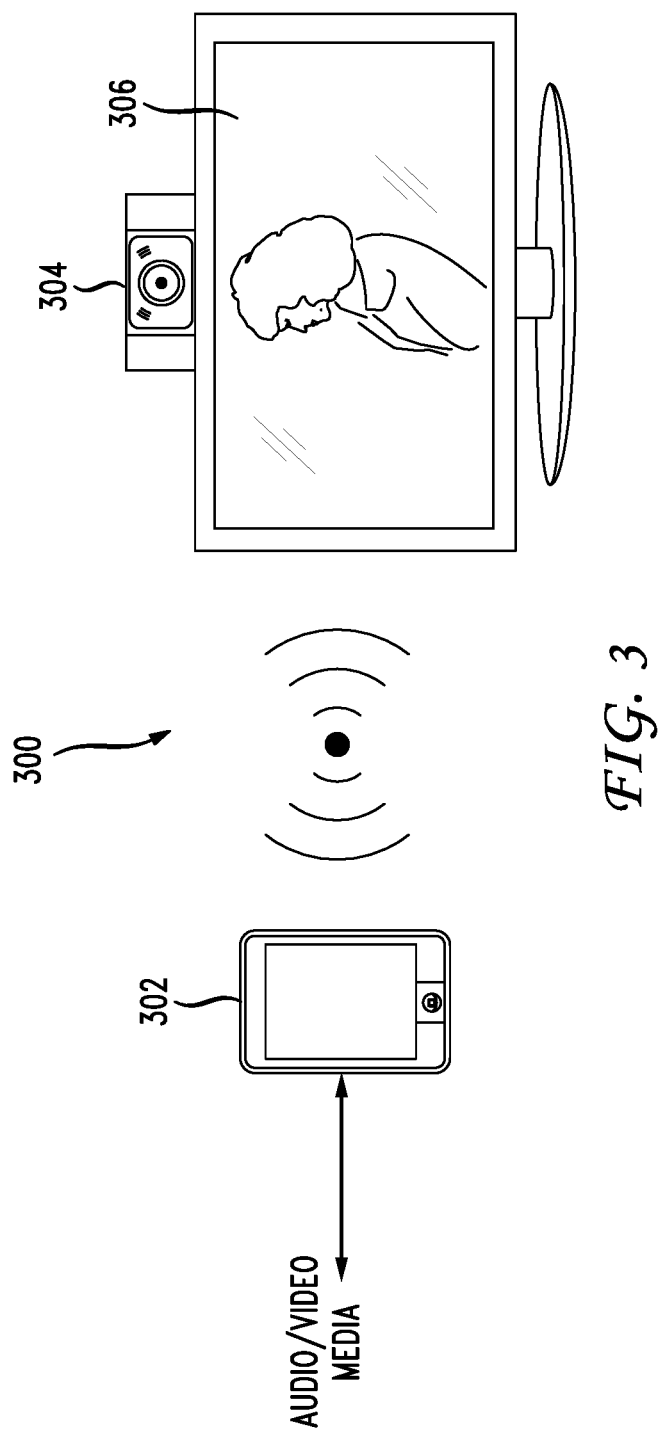
FIG. 3 illustrates an example of multiple wireless devices connected to form a single video conferencing endpoint.

FIG. 3 illustrates an example of multiple wireless devices connected to form a single video conferencing endpoint 300. The single video conferencing endpoint 300 includes a mobile phone 302, a wireless conference box 304, and a display 306. The mobile phone 302 and wireless conference box 304 communicate over a direct wireless connection based on 802.11 standards, such as WIFI direct. Moreover, the wireless conference box 304 and display 306 can communicate using any mechanism and/or interface suitable for transferring video data, such as HDMI, VGA, DVI, S-Video, wireless HDMI, WIFI, etc.

In FIG. 3, the mobile phone 302 receives audio and video media from the remote party in the conference call, outputs the audio through speakers on the mobile phone 302, and relays the video frames to the wireless conference box 304. The mobile phone 302 checks the lip synchronization attributes on the video frames to determine when to send the video frames to the wireless conference box 304, so the video frames can be timely decoded and displayed at the display 306. In particular, the mobile phone 302 receives the audio and video media from the remote party via a network, such as the Internet, a wireless network, an enterprise network, a LAN, a WAN, etc. The mobile phone 302 then sends the video frames to the wireless conference box 304 over a direct wireless connection, such as WIFI direct. The wireless conference box 304 receives the video frames from the mobile phone 302, decodes the video frames, and transmits the decoded video frames to the display 306 for presentation at the display 306.

The wireless conference box 304 includes a camera for capturing video to be transmitted to the remote party in the conference call. Moreover, the wireless conference box 304 sends compressed video frames from the camera to the mobile phone 302. The wireless conference box 304 can encode the video frames according to a suitable video compression standard, such as H.264. The mobile phone 302 receives the video frames from the wireless conference box 304, synchronizes the video frames and audio from the user, and sends the synchronized video and audio media to the remote party in the conference call. In one embodiment, the mobile phone 302 receives the video frames from the wireless conference box 304, appends network headers, sets lip synchronization attributes with audio from the user, and sends the video frames to the remote party in the conference call.

Although the video conferencing endpoint 300 in FIG. 3 includes a mobile phone 302, a wireless conference box 304, and a display 306, those of skill in the art can understand that the video conferencing endpoint 300 can include other devices. For example, the video conferencing endpoint 300 can include additional wireless conferencing boxes and/or displays to allow the user to transfer the video from the conference call to other devices if necessary based on the user's location and/or video requirements.

Figure 4:
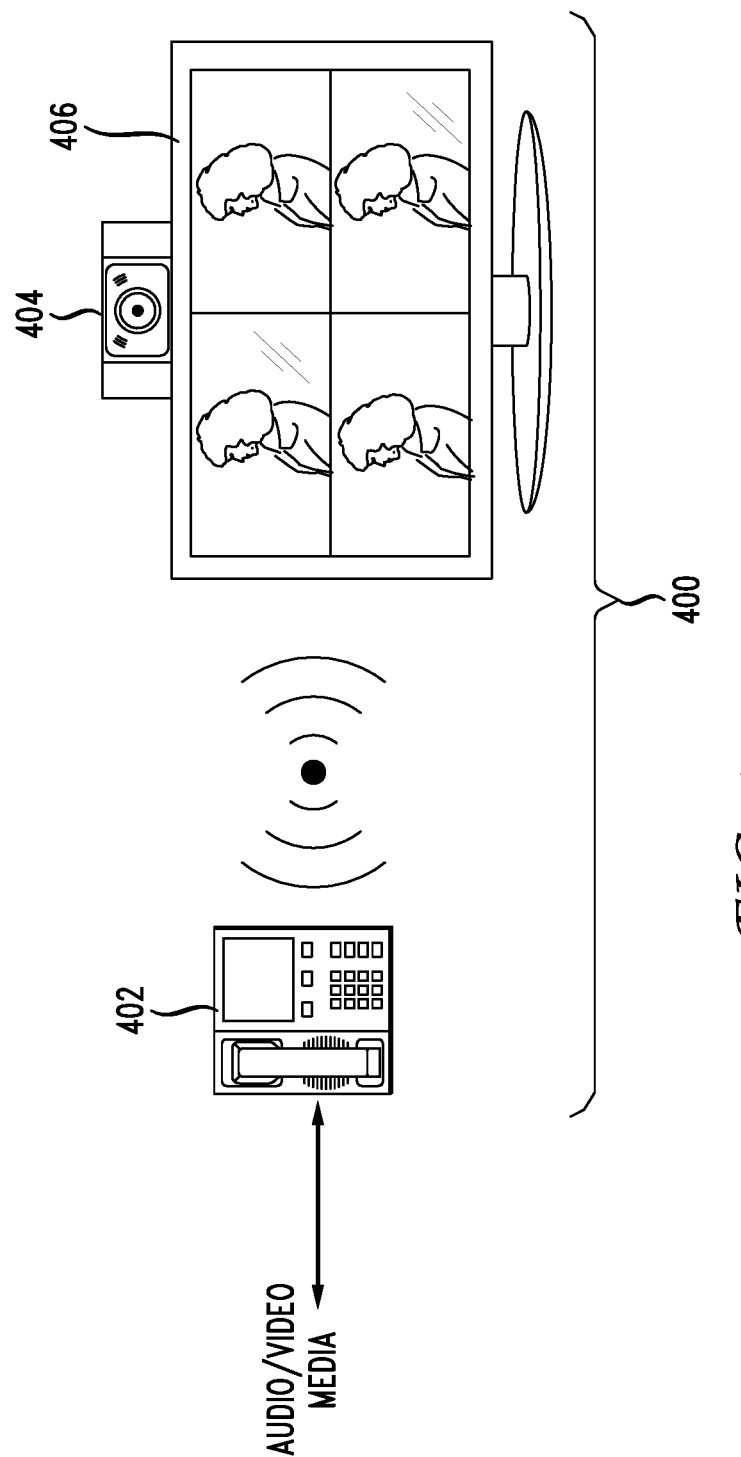
FIG. 4 illustrates an exemplary mechanism for adding a multiparty video conference to a desktop phone.

FIG. 4 illustrates an exemplary mechanism for adding a multiparty video conference to a desktop phone. The desktop phone 402 can connect to the wireless conference box 404 to add video to an audio call without transferring or reestablishing the entire call. The desktop phone 402 receives video from the remote parties and sends the video to the wireless conference box 404. The desktop phone 402 can also receive one or more packet streams (e.g., video streams and/or audio streams) from a network gateway in the multiparty video conference, for example. The wireless conference box 404 connects to the display 406 to display the video from the remote parties. The display 406 can divide the presentation of video by party, such that video from each remote party is displayed at a different portion of the display. In some embodiments, the wireless conference box 404 connects to multiple displays, and video from each remote party is displayed at a different display. The wireless conference box 404 also includes a camera to capture video. The wireless conference box 404 sends the captured video to the desktop phone 402, so the desktop phone 402 can then send the captured video to the remote parties as part of the video conference. Together, the desktop phone 402, the wireless conference box 404, and the display 406 form a single video conferencing endpoint 400 for a multiparty video conference.

Before sending the captured video to the desktop phone 402, the wireless conference box 404 can encode the video according to a suitable video compression standard, such as H.264. The desktop phone 402 can synchronize the video from the wireless conference box 404 with audio received from the user, and send the synchronized media to the remote parties. In one embodiment, the desktop phone 402 receives the compressed video from the wireless conference box 404, appends network headers, sets lip synchronization attributes with audio from the user, and sends the video to the remote parties in the conference call. When receiving video from the remote parties, the desktop phone 402 can check lip synchronization attributes to determine when to send the video to the wireless conference box 404 for presentation at the display 406, and when to output the corresponding audio received from the remote parties.

The desktop phone 402 and wireless conference box 404 connect directly via wireless. The wireless connection can be a direct, wireless connection based on the 802.11 standards, such as WIFI direct. Moreover, the desktop phone 402 and wireless conference box 404 can "see" each other using standard WIFI protocols. This allows the desktop phone 402 and wireless conference box 404 to automatically connect to each other when both devices are within a wireless range, which enables the desktop phone 402 to seamlessly add video to an audio conference. In addition, the desktop phone 402 and wireless conference box 404 can include a WIFI direct service application for exchanging information, such as information regarding security, video codec, framerate, resolutions, capabilities, etc. This facilitates the seamless connection between the desktop phone 402 and wireless conference box 404, and the integration of video into an audio conference.

In one embodiment, when the desktop phone 402 detects the wireless conference box 404, it asks the user of the desktop phone 402 if the user would like to connect to the wireless conference box 404 in order to add video to the audio conference. If the user accepts, the desktop phone 402 and wireless conference box 404 establish an application-level WIFI direct connection. The desktop phone 402 and wireless conference box 404 can directly communicate over a standard IP connection. The desktop phone 402 then notifies the remote parties of the new video capabilities provided by the wireless conference box 404 and display 406. If the remote parties respond with their own video capabilities, the desktop phone 402 can initiate video by sending a message to the wireless conference box 404 to initialize video in/out. The wireless conference box 404 can then send compressed video frames from the camera to the desktop phone 402. The desktop phone 402 receives the compressed video frames, appends network headers, sets lip synchronization attributes with audio from the user, and sends the video frames to the remote parties. Further, when the desktop phone 402 receives video frames from the remote parties, it checks lip synchronization attributes and, at the appropriate time, sends the video frames to the wireless conference box 404 to be decoded and displayed on the display 406. When the video frames are displayed at the display 406, the desktop phone 402 can output corresponding audio, such that the video frames and corresponding audio are presented in a synchronized manner.

Figure 5:
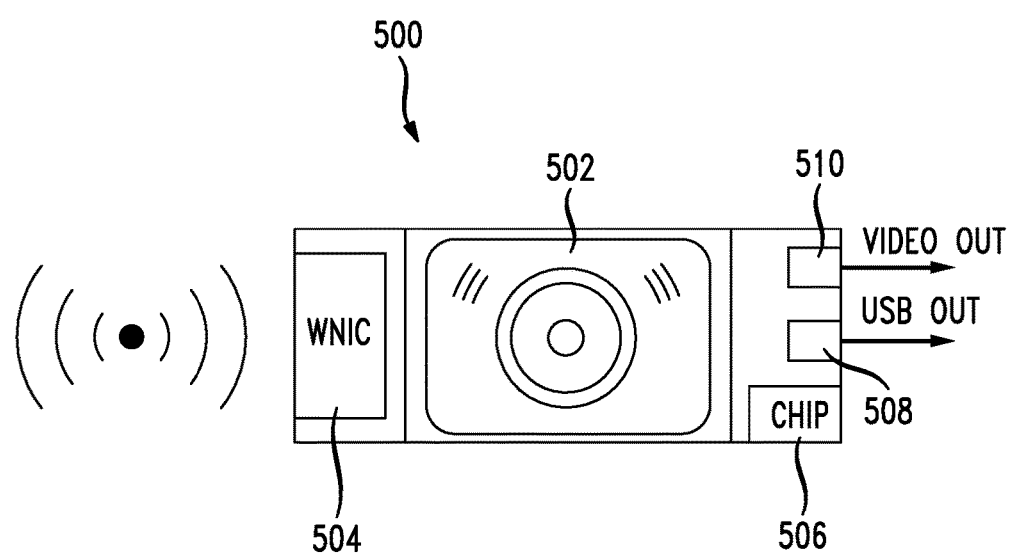
FIG. 5 illustrates an exemplary wireless conference box for adding video to an audio conference.

FIG. 5 illustrates an exemplary wireless conference box 500 for adding video to an audio conference. The wireless conference box 500 can connect to a phone, or any other device capable of supporting an audio call over IP (e.g., VoLTE, VoIP, wireless LAN, etc.), to add video conferencing capabilities to the phone and/or transfer video conferencing functions to the wireless conference box 500. The wireless conference box 500 includes a wireless network interface card 504 for wirelessly communicating with other devices. The wireless conference box 500 can use the wireless network interface card 504 to connect with a phone, or any other audio conferencing device, directly over wireless. The direct wireless connection can be based on 802.11 standards, such as WIFI direct. Moreover, the wireless conference box 500 can detect, and/or be detected by, other wireless devices using standard WIFI protocols. The wireless conference box 500 can also include a WIFI direct service application to wirelessly send and/or receive information such as information regarding security, video codec, framerate, resolutions, capabilities, etc.

The wireless conference box 500 includes a built-in camera 502 for capturing video. In some embodiments, the wireless conference box 500 does not include a built-in camera, but is connected to a separate, external camera. Further, the wireless conference box 500 can include an on-board chip 506 for encoding and decoding video frames. However, in some embodiments, the on-board chip 506 may not be necessary, for example, if an external camera is used that has its own encoder. Here, the wireless conference box 500 may not include the on-board chip 506 when the wireless conference box 500 is used with an external camera that has its own encoder. In some embodiments, the on-board chip 506 can support H.264 multi-stream encoding and decoding. Moreover, the wireless conference box 500 can include a video interface 510, such as HDMI and VGA, to connect to a display device, such as a monitor or a television. Furthermore, the wireless conference box 500 can include a universal serial bus (USB) interface 508 to connect and supply power to other devices, such as digital cameras, network adapters, microphones, speakers, webcams, media players, disk drives, flash drives, input devices, printers, computer peripherals, etc.

The wireless conference box 500 can also connect to other devices, such as displays and cameras, via the wireless network interface card 504, using different wireless protocols. For example, the wireless conference box 500 can connect to a display device, such as a television, using wireless HDMI. As another example, the wireless conference box 500 can use Wireless USB to connect to other devices, such as game controllers, printers, scanners, digital cameras, media players, hard disk drives, flash drives, microphones, speakers, etc.

Figure 6:
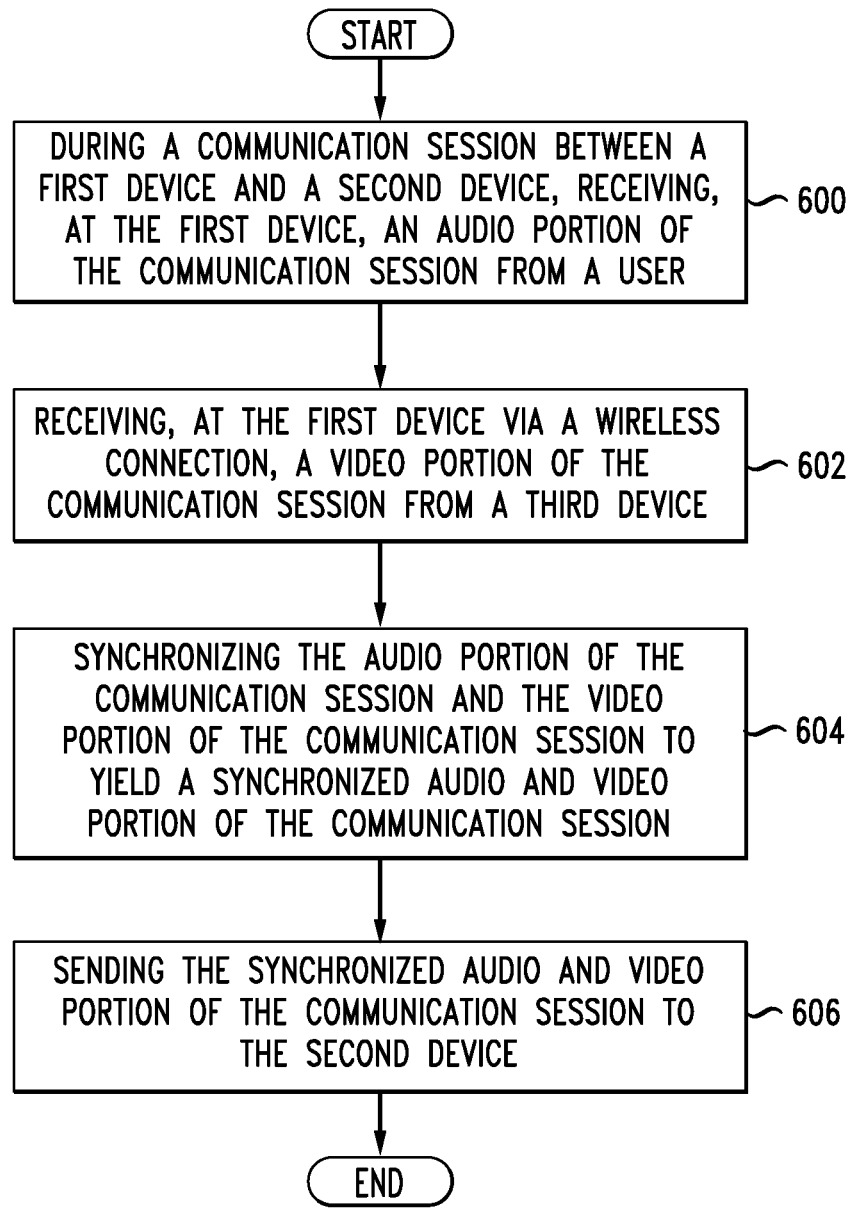
FIG. 6 illustrates an example method embodiment.

Having disclosed some basic system components and concepts, the disclosure now turns to the exemplary method embodiment shown in FIG. 6. For the sake of clarity, the method is described in terms of an exemplary system 100, as shown in FIG. 1, configured to practice the method. The steps outlined herein are exemplary and can be implemented in any combination thereof, including combinations that exclude, add, or modify certain steps.

During a communication session between the system 100 and a second device, the system 100 first receives an audio portion of the communication session from a user (600). The system 100 then receives, via a wireless connection, a video portion of the communication session from a third device (602). The system 100 receives the video portion of the communication session in order to add video to the communication session, or transfer the processing, creation, and/or display of video for an existing video portion of the communication session to the third device. For example, the communication session can be an audio-only communication session, which the system 100 can then expand to include video that the system 100 receives from the third device. To initiate a video portion of the communication session, the system 100 can send a message to the third device to initialize video input and output to establish video capabilities for the communication session. Once the third device initializes video input and output, it can send the video portion of the communication session to the system 100.

The video portion of the communication session can include compressed video frames captured by a camera associated with the third device, such as an internal camera or an external camera. The third device can be any device with wireless capabilities. For example, the third device can be a wireless conferencing gateway that transmits video frames captured from a camera device to the system 100. The third device can also include a video encoder and decoder, a camera, a wireless interface, and/or a video output. The wireless connection can be, for example, a direct wireless connection between the devices. The direct wireless connection can be based on the 802.11 standards, for example. For example, the system 100 and third device can directly connect to each other using a wireless standard such as WIFI Direct. Moreover, the system 100 and third device can do wireless pairing to allow the devices to seamlessly communicate with each other.

The system 100 can receive the video portion of the communication session in response to a request from a user and/or the system 100 to add video to the communication session. For example, the system 100 can receive the video portion of the communication session in response to a message sent by the system 100 to the third device prompting the third device to capture and/or send video frames to the system 100, as part of the communication session. The system 100 can also receive the video portion of the communication session based on a schedule, a condition, a behavior, a preference, a configuration setting, a threshold, an input, etc. Moreover, the system 100 can also receive the video portion of the communication session automatically when the system 100 and third device establish the wireless connection. The system 100 can establish the wireless connection automatically when the third device is within a wireless range, for example. In one embodiment, the system 100 automatically establishes the wireless connection with the third device via WIFI direct, when the third device is within a wireless range. Before establishing the wireless connection, the system 100 can prompt the user of the system 100 to enable/allow the wireless connection. The system 100 can then establish the wireless connection once it receives confirmation/permission from the user. The prompt can be an audio prompt, a video prompt, a text prompt, an email, a text message, an alert, an announcement, a graphical prompt, a sound, an image, and/or a combination thereof. For example, the prompt can be an audible request to establish the wireless connection with the third device.

Alternatively, the system 100 can establish the wireless connection transparently, without prompting the user to enable/allow the wireless connection. Here, the system 100 can establish the wireless connection automatically when the third device is within a wireless range, when the system 100 detects a specific condition and/or behavior, when the system 100 detects a request from the third device, etc. For example, the system 100 can automatically establish the wireless connection when the second device attempts to send video frames to the system 100. The system 100 can also establish the wireless connection based on an input, a schedule, a setting, a threshold, an error, a condition, a preconfigured preference, and so forth. For example, the system 100 can automatically establish the wireless connection if it detects that the video capabilities of the system 100 and/or a display device connected to the system 100 are below a threshold.

Next, the system 100 synchronizes the audio portion of the communication session and the video portion of the communication session to yield a synchronized audio and video portion of the communication session (604). To synchronize the audio and video portions of the communication session, the system 100 can set lip synchronization attributes on the video portion of the communication session with audio from the audio portion of the communication session.

Then, the system 100 sends the synchronized audio and video portion of the communication session to the second device (606). The system 100 sends the synchronized audio and video portion of the communication session as part of the communication session between the system 100 and the second device. If the system 100 then receives video and audio frames associated with the communication session from the second device, the system 100 can check lip synchronization attributes on the video frames and, at a time that is based at least in part on the lip synchronization attributes, send the video frames to the third device to be decoded and displayed at the third device. This way, the third device can display the video frames from the second device, while the system 100 outputs corresponding audio frames from the second device, so that the video and audio frames are outputted in a synchronized manner.

The system 100 can also receive additional portions of the communication session from other devices in addition to the third device. For example, if the user of the system 100 wants to move to a location beyond the wireless range of the third device, or if the user simply wants to display the video of the communication session at a different display device, the user can do so by wirelessly connecting the system 100 to a fourth device with wireless capabilities. Here, the system 100 can receive a second portion of the communication session from the fourth device, synchronize the second video portion of the communication session and a corresponding audio portion of the communication session, and send the synchronized audio and video portion of the communication session to the second device. The system 100 can wirelessly connect to the third and/or fourth device when the system 100 detects that the third and/or fourth device is/are within wireless range of the system 100. The system 100 can also connect to other wireless devices to receive other video portions of the communication session, as the user moves to different locations or prompts the system 100 to establish a wireless connection to the other wireless devices, for example.

As the system 100 connects to other wireless devices, it can seamlessly add or transfer video for the communication session without having to transfer or reestablish the entire communication session. The following non-limiting example is illustrative. Bill, a manager who is away on a business trip, calls Andy, one of Bill's employees, on Andy's WIFI direct enabled smartphone. In this example, Bill calls Andy from a WIFI direct enabled smartphone that is connected to a WIFI direct video conferencing device, which is connected to a camera and a monitor. When Andy accepts the call, he is in the breakroom, which does not have a nearby WIFI direct video conferencing device. Accordingly, Andy is initially only able to participate in an audio call with Bill. However, while talking to Bill, Andy returns to his office, where he has a WIFI direct video conferencing device connected to his computer's monitor and webcam. When Andy enters his office, his smartphone detects the WIFI direct video conferencing device and presents Andy with an option to add video to the call through the WIFI direct video conferencing device. Andy then selects the option to add video, which prompts Andy's smartphone to establish a wireless connection to the WIFI direct video conferencing device and initialize video input and output. The WIFI direct video conferencing device adds the video to the call, without reestablishing or transferring the entire call. Moreover, the WIFI direct video conferencing device handles the video to and from Bill's smartphone, while Andy's smartphone handles the audio to and from Bill's smartphone.

Bill then decides that he wants to include Cindy and Earl in the call. Also, Andy decides that he wants to continue the conference with Cindy and Earl in a larger room equipped with a larger display device. Accordingly, Andy gathers Cindy and Earl and walks to the conference room, which has more space and a larger display device, while continuing to talk to Bill from the smartphone. Because Andy did not disable the video conferencing option on his smartphone, the smartphone utilizes WIFI direct to discover nearby WIFI direct video conferencing devices. As Andy walks into the conference room, his smartphone detects the WIFI direct video conferencing device in the conference room and automatically establishes a WIFI direct connection to the WIFI direct video conferencing device. The WIFI direct video conferencing device in the conference room then begins to handle the video to and from Bill's smartphone. The WIFI direct video conferencing device in the conference room sends the video captured from a local camera to Andy's smartphone, and then sends the video to Bill's smartphone. Moreover, the WIFI direct video conferencing device in the conference room can output the video from Bill's smartphone on a large display in the conference room, for all, Andy, Cindy, and Earl, to see. Andy can select a speakerphone option on his smartphone, to allow his smartphone to output the audio from Bill's smartphone through the speakers for Andy, Cindy, and Earl to hear. This way, Andy can transfer the video portion of a conference to a different device without transferring or reestablishing the entire call, while also continuing to participate in the audio portion of the conference.

Figure 7:
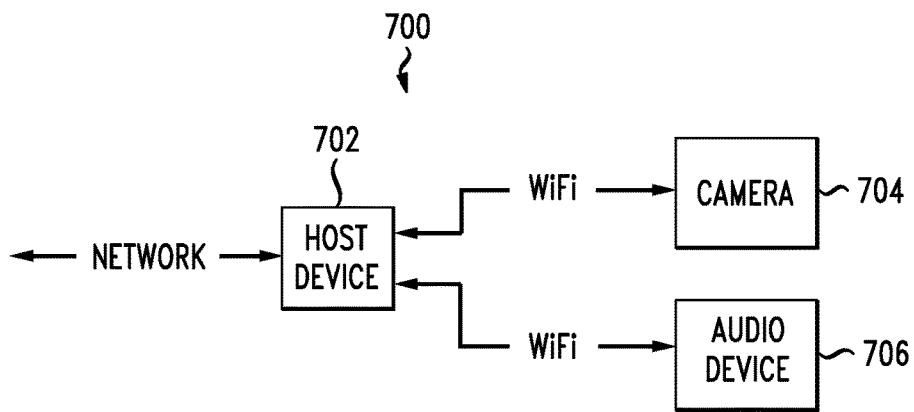
FIG. 7 illustrates a context of the improvement disclosed herein.

Having disclosed some basic computing system components, the disclosure returns to a discussion of the present disclosure. FIG. 7 illustrates the general concept 700 disclosed in the '130 patent application in which the camera 704 and audio device 706 shown must pass their data through the host device 702 to the network. A Wi-Fi connection is shown between each of the camera 704 and the host device 702 and the audio device 706 and the host device 702.

Disclosed is an approach to reducing the need to convey media between a capturing device and the host device. The new approach allows an adjunct device to send the media directly to an end device, rather than through a network such as the Internet. Thus, a transmitting device that has, for example, a video attached to an email or that has a camera that is capturing video for a video conference that is to be communicated to another device, can use an RTCP sync that will cause the media to be transmitted directly, via bluetooth, Wi-Fi, or some other protocol, to the remote device. Another device can do call signaling rather than the transmitting device. This concept will increase the amount of cases where the ideas disclosed in the parent patent application can be deployed (such as through a P2P communication between the devices that can be over a lower bandwidth). The new approach can also reduce the load on a main device in a network thus making the concepts disclosed above in the original patent applicable more applicable to mobile devices or simple devices such as table top phones, mobile phones or desk phones.

Figure 8:
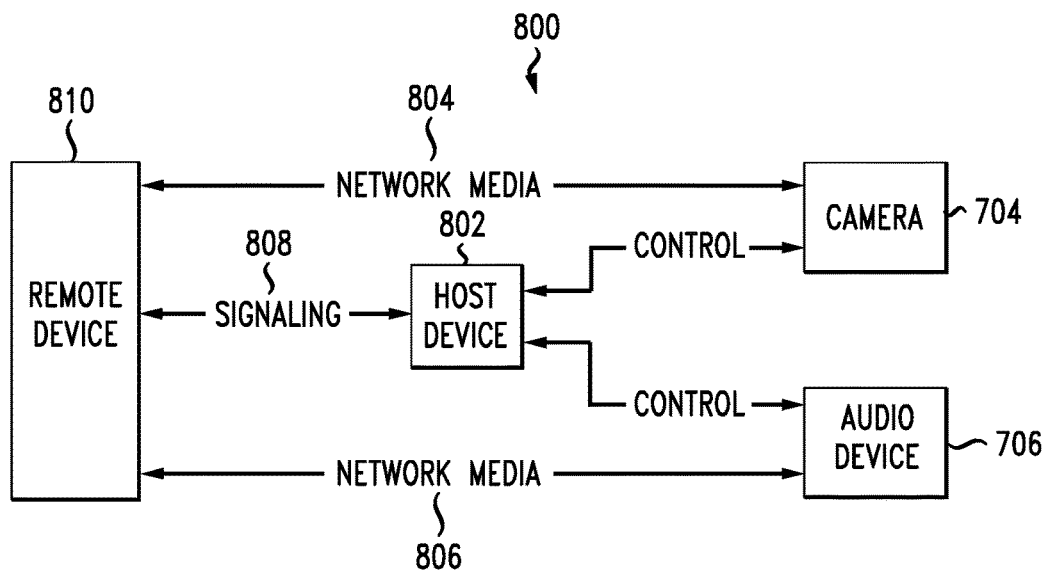
FIG. 8 illustrates an example embodiment.

This disclosure includes, as indicated in the system 800 disclosed in FIG. 8, a host device 802 that will perform call signaling using the following procedure (or similar). The host device 802 detect adjunct peripherals such as camera 704 and/or audio device 706. Of course these can represent other devices as well such as microphones or other sensors. The host device 802 coordinates the media capabilities (as a preparation to be able to signal their capabilities) of the various peripheral devices. In addition in this step, the host device 802 and the peripheral devices 704, 706 can synchronize wall clocks (either by using a network time protocol or a similar peer to peer network time protocol). The host device 802 then sets up a call (or receive a call) 808 from a remote device 810, and requests the peripherals 704,706 to check for network connectivity 804, 806 to the remote device 810 (connectivity check). The connectivity check can be done by using a STUN/TURN procedure. This is a session traveral unititles for network address translation (NAT) (STUN) protocol for such address discovery including a NAT classification. The traversal using relays around NAT (TURN) places a third-party server to relay messages between two clients when direct media traffic between peers is not allowed by a firewall. The system then establishes a direct connectivity between the peripherals 704,706 and the remote device 810.

The host device 802 can then monitor a lip sync by transferring RTCP messages between the host device 802 and the peripheral devices 704, 706 and instruct display and playback peripherals/sub systems to align lip sync. In other words, the system will align audio and video among the various devices.

The procedure described above can support the following variants. The system can align encryption and decryption keys (assuming the interface between the host device 802 and the peripherals 704, 706 is encrypted). The system can enter into a fallback to "routed mode" in case a peripheral device 704, 706 cannot reach the remote device 810. The system can enter into a fallback to routed mode during a session in case the network line 804/806 between the respective peripheral device 704/706 and the remote device 810 is of lower quality comparing to the line 808 of the host device 802 to the remote device 810. The system can also manage the alignment of network QoS (quality of service) settings.

An alternate step can include an automatic detection scheme in which the host device 802 and the first or second peripheral device can be detected suing proximity sensing via such technologies as electromagnetic sensing, sonic, visual or any other detection cue. The approach can also include transferring the control or management protocols between the host device 802 and the peripherals via a proxy server.

The main benefit of the approach disclosed herein is how the group of devices would divide up responsibilities between call signaling and RTCP synchronization to reduce the need for conveying media between particular devices 704/706 via a host device 802. Another advantage is to introduce a way to leverage existing simple devices and with a simple software upgrade to allow these devices to include new media modalities, such as video, while avoiding the pitfalls of limitations of CPU or network capabilities. This is accomplished by allowing the peripherals (video camera, display unit) to transmit/receive directly to the network.

Figure 9:
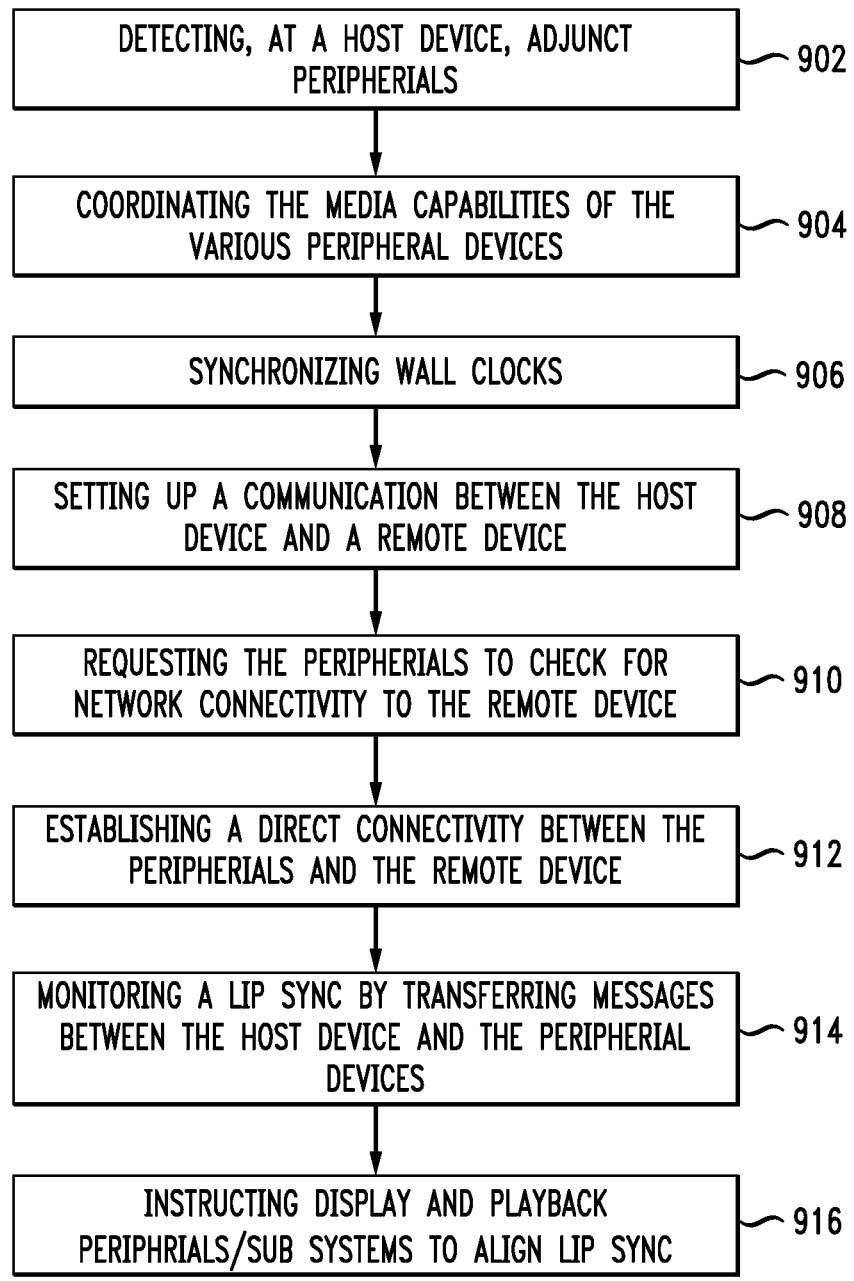
FIG. 9 illustrates an example method embodiment.

FIG. 9 illustrates an example method embodiment. The method is primarily practiced by the host device 802 but various steps may need to be taken by different devices. The method includes detecting at the host device 802 adjunct peripherals such as camera 704 and/or audio device 706 (902). Of course these can represent other devices as well. The host device 802 then performs the step of coordinating the media capabilities (as a preparation to be able to signal their capabilities) of the various peripheral devices (904). This can include such features as identifying a number of pixels or a resolution of a graphical interface, and audio capabilities, processing capabilities and so forth. In addition in this step, the host device 802 and the peripheral devices 704, 706 can perform the operation of synchronizing wall clocks (either by using NTP or are peer to peer network time protocol) (906). The host device 802 then performs the step of setting up a call (or receive a call) 808 from a remote device 810 (908), and requesting the peripherals 704,706 to check for network connectivity 804, 806 to the remote device 810 to achieve a connectivity check (910). The connectivity check can be done by using a STUN/TURN procedure. The system then performs the step of establishing a direct connectivity between the peripherals 704,706 and the remote device 810 (912).

The host device 802 can then perform the step of monitoring a lip sync by transferring RTCP messages between the host device 802 and the peripheral devices 704, 706 (914) and instructing display and playback peripherals/sub systems to align lip sync (916). In other words, the system will align audio and video among the various devices. RTCP messages relate to the real time transport protocol control protocol. It has a functionality and packet structure defined in PRC 3550. The RTCP provides out-of-band statistics and control information for an RTP session.

The procedure described above can support the following variants. The system can align encryption and decryption keys (assuming the interface between the host device 802 and the peripherals 704, 706 is encrypted). The system can enter into a fallback to "routed mode" in case a peripheral device 704, 706 cannot reach the remote device 810. The system can enter into a fallback to routed mode during a session in case the network line 804/806 between the respective peripheral device 704/706 and the remote device 810 is of lower quality comparing to the line 808 of the host device 802 to the remote device 810. The system can also manage the alignment of network QoS (quality of service) settings.

The main benefit of the approach disclosed herein is how the group of devices would divide up responsibilities between call signaling and RTCP synchronization to reduce the need for conveying media between particular devices 704/706 via a host device 802.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media or device can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Non-transitory computer-readable components include a storage device. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    detecting, at a host device, a first peripheral and a second peripheral, wherein the host device is a first user communication device;
    coordinating, by the host device, media capabilities of the first peripheral and the second peripheral;
    synchronizing wall clocks amongst the host device, the first peripheral, and the second peripheral;
    establishing a signaling channel for a real-time voice and/or video communication between the host device and a remote device, wherein the remote device is a second user communication device;
    in response to establishing the signaling channel for the real-time voice and/or video communication, requesting, by the host device, the first peripheral and the second peripheral to check for network connectivity to the remote device;
    establishing direct connectivity between the first peripheral and the remote device;
    establishing direct connectivity between the second peripheral and the remote device;
    monitoring a synchronization by transferring messages between the host device and the first peripheral and the second peripheral; and
    instructing a display and playback peripheral to align with the synchronization.

2. The method of claim 1, wherein the first peripheral is one of a video device and an audio device.

3. The method of claim 1, wherein synchronizing wall clocks further comprises using one of a network time protocol or a peer to peer network time protocol.

4. The method of claim 1, wherein the first peripheral and the second peripheral check for network connectivity to the remote device using a STUN/TURN procedure.

5. The method of claim 1, wherein monitoring the synchronization by transferring messages between the host device and the first peripheral and the second peripheral further comprises transferring RTCP messages between the host device and one of the first peripheral and the second peripheral.

6. The method of claim 1, wherein the synchronization further comprises one of an alignment of encryption and decryption keys and an alignment of quality of service parameters.

7. The method of claim 1, further comprising falling back into a routed mode when
    a communication link between one of the first peripheral and the second peripheral is of lower quality when compared to a communication link between the host device and the remote device.

8. A system comprising:
    a processor; and
    a computer-readable storage medium storing instructions which, when executed by the processor, cause the processor to perform operations comprising:
    detecting, at a host device, a first peripheral and a second peripheral, wherein the host device is a first user communication device;
    coordinating, by the host device, media capabilities of the first peripheral and the second peripheral;
    synchronizing wall clocks amongst the host device, the first peripheral and the second peripheral;
    establishing a signaling channel for a real-time voice and/or video communication between the host device and a remote device, wherein the remote device is a second user communication device;
    in response to establishing the signaling channel for the real-time voice and/or video communication, requesting, by the host device, the first peripheral and the second peripheral to check for network connectivity to the remote device;
    establishing direct connectivity between the first peripheral and the remote device;
    establishing direct connectivity between the second peripheral and the remote device;
    monitoring a synchronization by transferring messages between the host device and the first peripheral and the second peripheral; and
    instructing a display and playback peripheral to align with the synchronization.

9. The system of claim 8, wherein the first peripheral is one of a video device and an audio device.

10. The system of claim 8, wherein synchronizing wall clocks further comprises using one of a network time protocol or a peer to peer network time protocol.

11. The system of claim 8, wherein the first peripheral and the second peripheral check for network connectivity to the remote device using a STUN/TURN procedure.

12. The system of claim 8, wherein monitoring the synchronization by transferring messages between the host device and the first peripheral and the second peripheral further comprises transferring RTCP messages between the host device and one of the first peripheral and the second peripheral.

13. The system of claim 8, wherein the synchronization further comprises one of an alignment of encryption and decryption keys and an alignment of quality of service parameters.

14. The system of claim 8, wherein the computer-readable storage medium stores additional instructions which, when executed by the processor, cause the processor to perform further operations comprising falling back into a routed mode when
a communication link between one of the first peripheral and the second peripheral is of lower quality when compared to a communication link between the host device and the remote device.

15. A non-transitory computer-readable storage device storing instructions which, when executed by a processor, cause the processor to perform operations comprising:
detecting, at a host device, a first peripheral and a second peripheral, wherein the host device is a first user communication device;
coordinating, by the host device, media capabilities of the first peripheral and the second peripheral;
synchronizing wall clocks amongst the host device, the first peripheral, and the second peripheral;
establishing a signaling channel for a real-time voice and/or video communication between the host device and a remote device, wherein the remote device is a second user communication device;
in response to establishing the signaling channel for the real-time voice and/or video communication, requesting, by the host device, the first peripheral and the second peripheral to check for network connectivity to the remote device;
establishing direct connectivity between the first peripheral and the remote device;
establishing direct connectivity between the second peripheral and the remote device;
monitoring a synchronization by transferring messages between the host device and the first peripheral and the second peripheral; and
instructing a display and playback peripheral to align with the synchronization.

16. The non-transitory computer-readable storage device of claim 15, wherein synchronizing wall clocks further comprises using one of a network time protocol or a peer to peer network time protocol.

17. The non-transitory computer-readable storage device of claim 15, wherein the first peripheral and the second peripheral check for network connectivity to the remote device using a STUN/TURN procedure.

18. The non-transitory computer-readable storage device of claim 15, wherein monitoring the synchronization by transferring messages between the host device and the first peripheral and the second peripheral further comprises transferring RTCP messages between the host device and one of the first peripheral and the second peripheral.

19. The non-transitory computer-readable storage device of claim 15, wherein the synchronization further comprises one of an alignment of encryption and decryption keys and an alignment of quality of service parameters.

20. The non-transitory computer-readable storage device of claim 15, wherein the non-transitory computer-readable storage device stores additional instructions which, when executed by the processor, cause the processor to perform further operations comprising falling back into a routed mode when
a communication link between one of the first peripheral and the second peripheral is of lower quality when compared to a communication link between the host device and the remote device.

* * * * *